March 26, 1929.  G. D. BAGLEY ET AL  1,706,950
ELECTROLYTIC RECTIFIER
Filed June 28, 1924
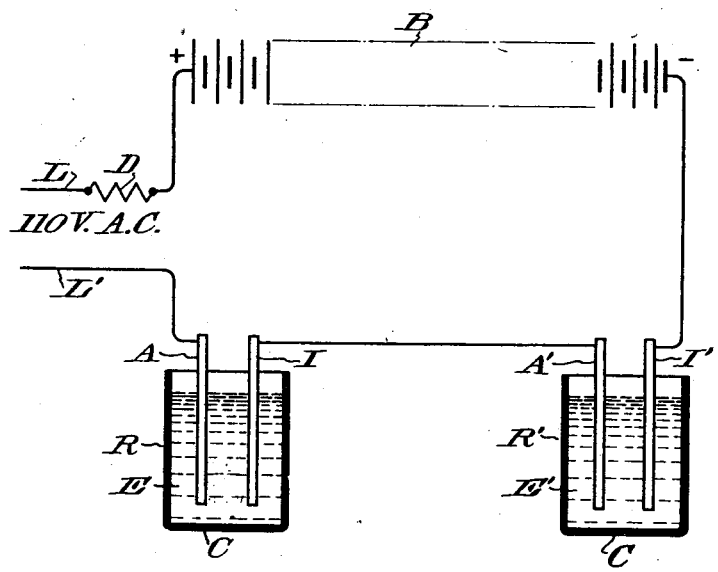
Inventors:
Glen D. Bagley &
Fred T. Bowditch
By Byrnes, Townsend & Brickenstein
Attorneys.

Patented Mar. 26, 1929.

1,706,950

UNITED STATES PATENT OFFICE.

GLEN D. BAGLEY, OF GREAT NECK, AND FRED T. BOWDITCH, OF ELMHURST, NEW YORK, ASSIGNORS TO THE NATIONAL CARBON COMPANY, INC., A CORPORATION OF NEW YORK.

ELECTROLYTIC RECTIFIER.

Application filed June 28, 1924. Serial No. 723,030.

This invention relates to electrolytic rectifiers, the action of which depends upon a dielectric film that is formed upon the surface of a so-called filming electrode when the latter and a cooperating electrode are immersed in a suitable electrolyte and subjected to an electric current.

A common type of electrolytic rectifier comprises a lead electrode cooperating with an electrode of filming material such as aluminum in a suitable electrolyte, such as a solution of citric acid, ammonium citrate or ammonium phosphate. Lead is somewhat soluble in these and other rectifier solutions, so that there is always a soluble lead salt in the electrolyte, which stays in solution until the rectifier stands idle with no current flowing therethrough. Thereupon, the dissolved lead, even though it may be present in a very minute quantity, is precipitated as a film onto the aluminum electrode, which is strongly electropositive with respect to lead. Subsequently, when the alternating current is applied, the apparatus has in effect two lead electrodes, and no rectification takes place until electrolytic action removes the lead film from the aluminum.

Under such circumstances, and for example when the rectifier is connected in circuit with a storage battery to be charged from the usual 110 volt alternating current mains with an insufficient series resistance to limit the heavy current which flows while the lead film exists, a destructive current flows through the rectifying means and damages the latter and the battery to which it is connected. This undesirable condition is most likely to occur when two rectifiers are connected in series, in charging a 100 volt B-storage-battery from the usual 110 volt alternating current circuit, for example.

The primary object of the present invention is to avoid the foregoing objectionable performance and other deleterious action of the usual lead electrode by employing, in cooperative relation to the filming aluminum electrode, an electrode that is desirably electronegative toward such filming electrode in a given electrolyte but substantially inert to the action of the electrolyte and insoluble in the electrolyte solution under all conditions, so that substantially no coating will be formed on the surface of the filming electrode that would have a deleterious effect upon the filming characteristic of the latter.

The accompanying drawing diagrammatically illustrates a rectifier construction and arrangement embodying the present invention.

As shown in the drawing, one or more electrolytic rectifiers may be connected in series circuit with the alternating current supply mains L, L' and the storage battery B to supply direct current for charging the latter from the alternating current source.

For present purposes, the two rectifiers shown are desirably identical in all essential respects. Each rectifier consists of a suitable receptacle C for containing the electrolyte E, which may contain a citrate radicle or consist of citric acid, a solution of ammonium citrate, ammonium phosphate, or similar substance or mixtures thereof. Cooperating electrodes A and I are disposed in the electrolyte, in which the electrode A is electropositive with respect to the electrode I. The electrode A consists of a plate or bar of filming material such as aluminum upon which a dielectric film is formed during the action of the rectifier. The associated electrode I consists of a solid material that is inert toward the electrolyte and insoluble therein under all conditions. It has been found that graphite, lead peroxide, manganese peroxide and other similar conductive solid metal oxides make satisfactory electrodes for this purpose. Ordinary ungraphitized carbon electrodes are impracticable as the inert electrodes for present purposes principally because they deteriorate too rapidly. During the operation of the rectifier, the current supplied from the alternating current source is rectified. During such electrolytic action and also during idle periods the electrode I, that is inert toward the electrolyte, will not dissolve nor deteriorate.

An aluminum-lead rectifier may operate fairly economically under voltage conditions where a single rectifier is sufficient, because the deposit of lead upon the aluminum electrode will usually though not invariably practically correct itself. However, in any instance where the alternating voltage supplied either by a transformer or directly from the alternating current mains is so near to the battery voltage that a high protective series resistance is not used, damage as mentioned above is very likely to result. This is particularly true where it is advisable or necessary, especially because of the cumulative effect of high supply and battery voltages during one half wave, to employ two or more rectifiers connected in series circuit with alternating current supply mains and a storage battery to be charged; for example, in charging a 100 volt storage battery from a 110 volt alternating current line. As shown, a series protective resistance D may also be employed. Where two or more series-connected aluminum-lead rectifiers are used after a period of idleness, the aluminum electrode of one rectifier is apt to get into proper working condition while the aluminum electrode of the other rectifier is still coated with a lead film. The rectifier which forms its film first apparently shuts off, by its rectifying action, the current that is effective in re-forming the film on the filming electrode in each of the other rectifiers. Then, the current passing through the one operating rectifier overheats the electrolytes, evaporating them and eventually damaging the rectifiers and probably also the storage battery in circuit therewith.

In charging storage batteries in series with an alternating current source and electrolytic rectifying means, the voltage of the battery which can be charged is limited by the breakdown voltage of or resistance offered by the electrolytic film on the filming electrode. For example, the breakdown voltage for the film formed on an aluminum electrode is about 185 volts and that on a tantalum electrode is about 85 volts. This limitation may be avoided by using two or more electrolytic rectifiers in series, the number of rectifiers depending upon the values of the applied alternating current and the terminal voltage of the charged battery. In the rectifying arrangement as illustrated in the drawing, only one half wave is rectified and supplied to the battery. Here, the applied voltage of the alternating current supply has an indicated value of about 110 volts and a peak value of about 155 volts. If it is assumed that the terminal voltage of the charged battery is about 100 volts, it will be evident that when no current flows during alternate non-rectified half waves, the rectifying film in the circuit should withstand about 255 volts, which is above the limit of the aluminum electrode film, for instance. Accordingly, it is necessary to connect two or more rectifiers in series when the sum of the voltage of the charged battery and the peak voltage of the applied alternating current exceeds the breakdown voltage of the film on the filming electrode of a single rectifier.

As shown, the two rectifiers are connected in series with a 100 volt battery and a 110 volt alternating current supply to rectify only alternate half waves of the latter, and such rectifiers are effectively protected against failure relatively to one another, because each comprises a non-filming electrode of lead peroxide or the like that is inert toward the electrolyte and therefore substantially no lead or other coating will be formed on the filming electrode that might practically nullify the filming characteristic of the latter. Rectifiers of the type disclosed may be grouped in series-parallel and otherwise to rectify both halves of the alternating current wave; the electrolyte may be of the kind disclosed in an application Serial No. 721,545, filed in the name of Fred T. Bowditch on June 21, 1924, and executed on June 17, 1924; and other changes may be made in the disclosure without departing from the spirit of this invention.

We claim:

1. An electrolytic rectifier comprising an electrolyte containing a citrate radicle, and electrodes therein, one of said electrodes comprising aluminum and the other electrode comprising a conductive solid metal oxide.

2. In an electrolytic rectifier, the combination of an electrolyte containing a citrate radicle and cooperating electrodes therein, one of said electrodes comprising aluminum, and the other electrode comprising lead peroxide.

In testimony whereof, we affix our signatures.

GLEN D. BAGLEY.
FRED T. BOWDITCH.